April 16, 1957　　　　　E. E. HOSEA　　　　　2,788,675
PRESELECT AUTOMATIC CHANGE SPEED GEAR SHIFT
Filed July 29, 1953　　　　　　　　　　　　3 Sheets-Sheet 1
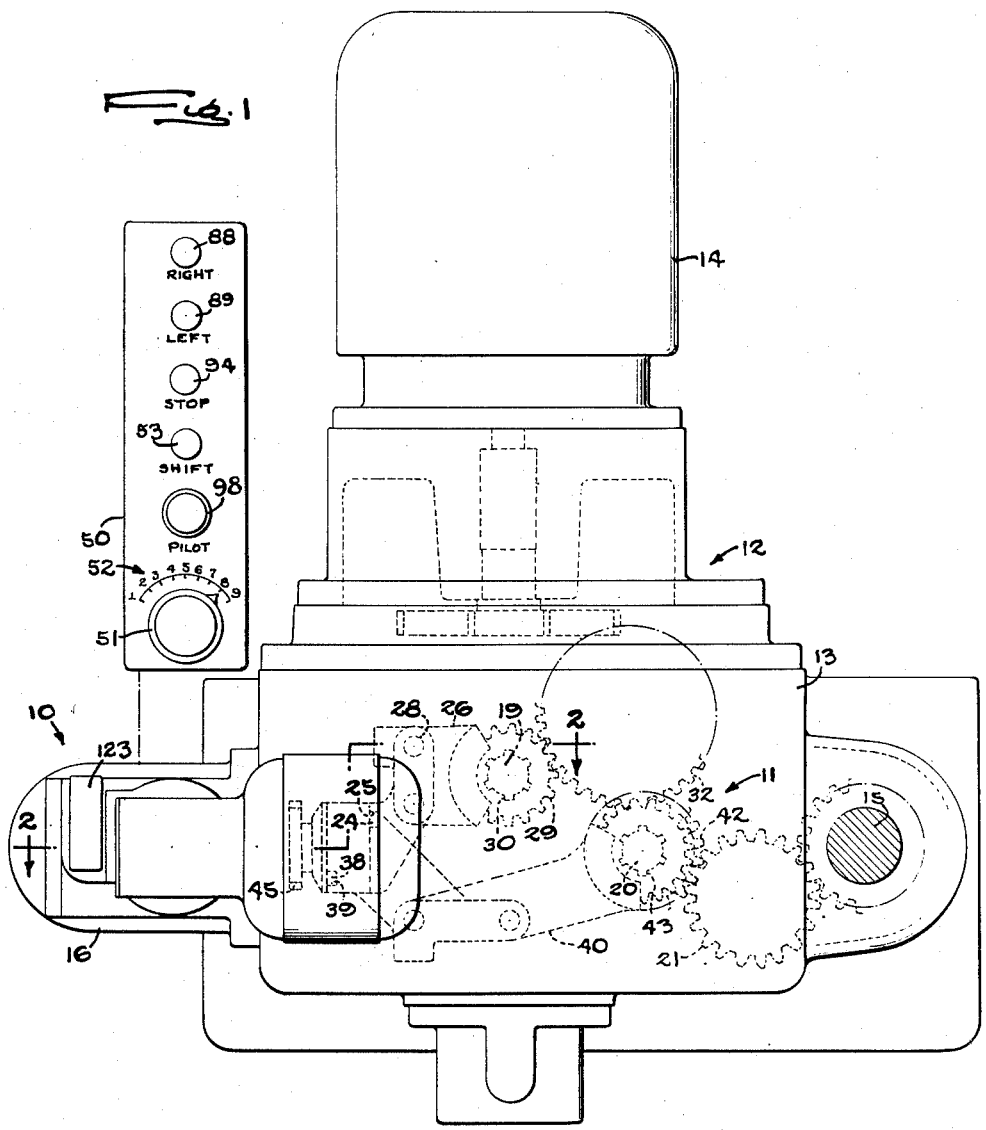
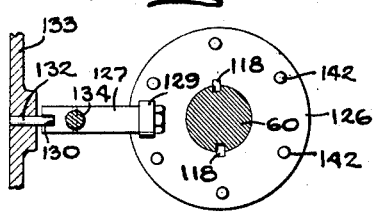

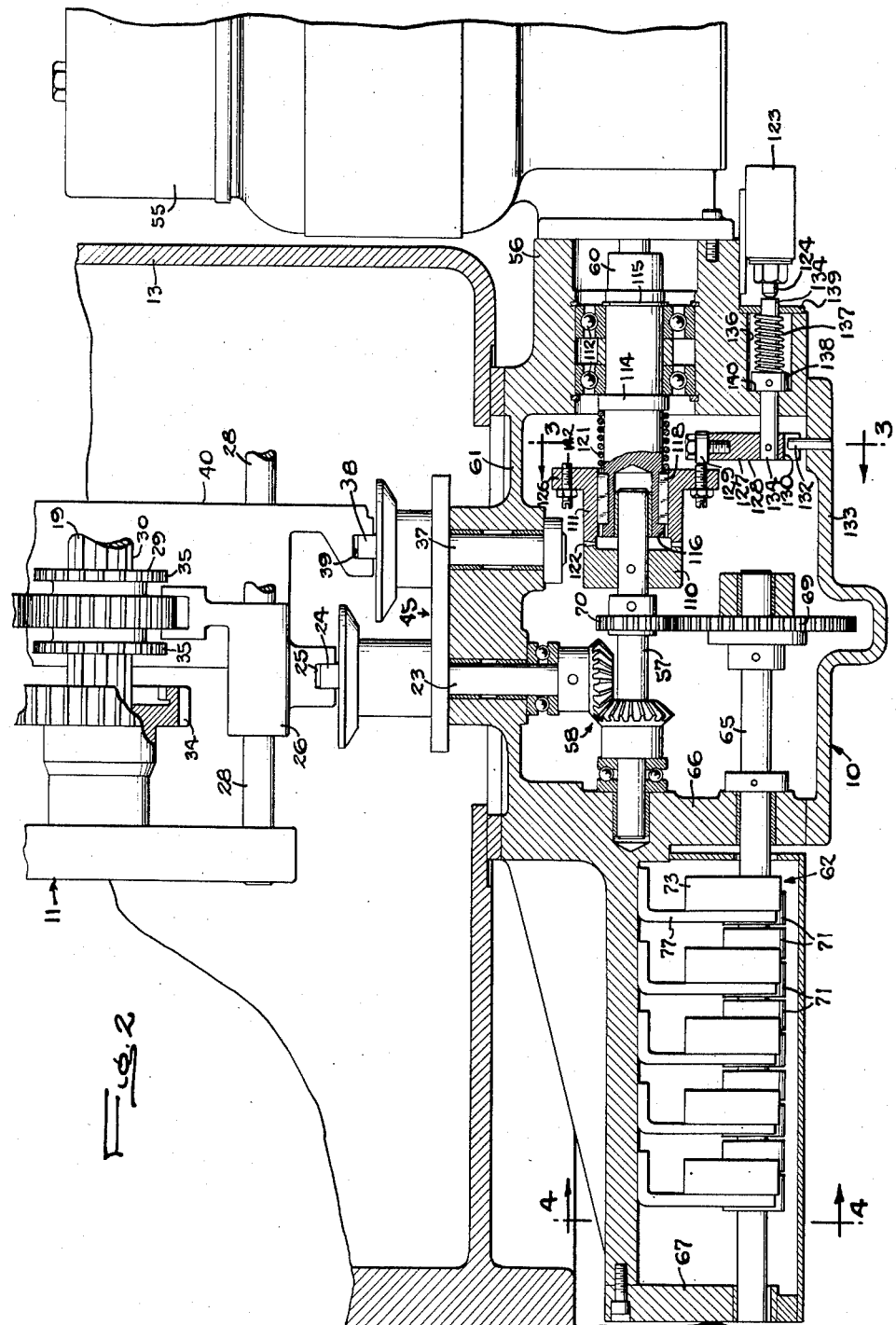

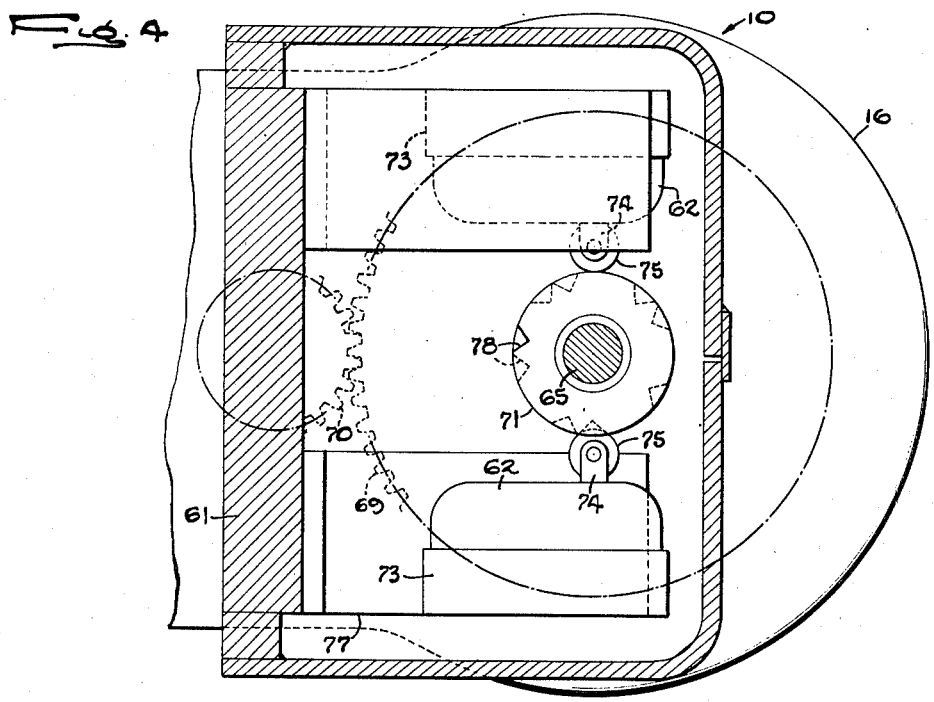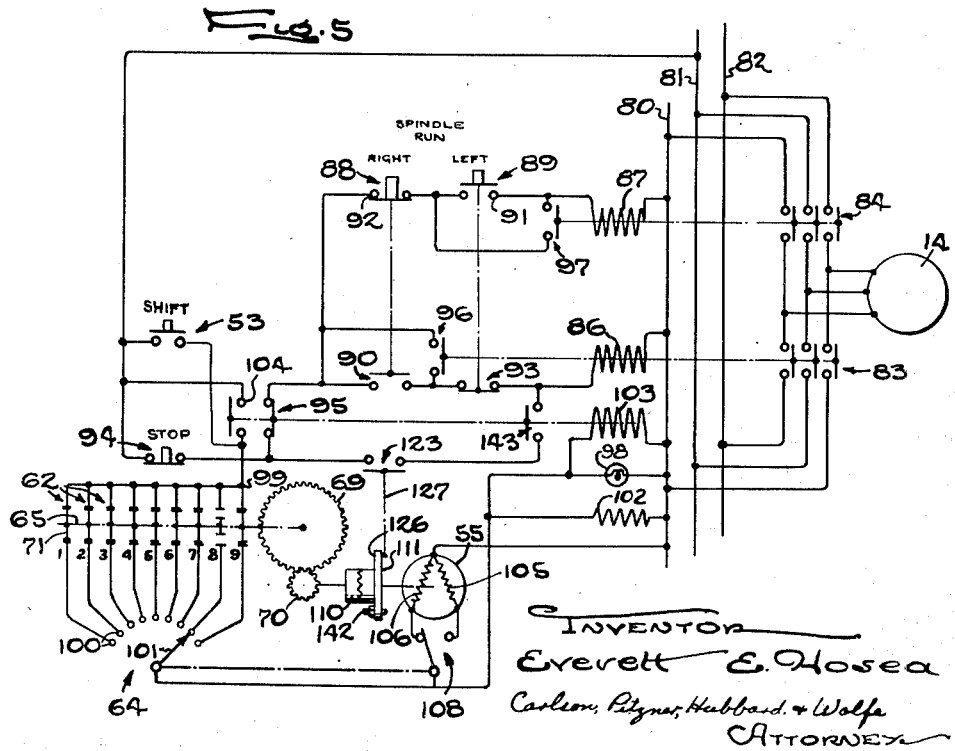

United States Patent Office 2,788,675
Patented Apr. 16, 1957

2,788,675

PRESELECT AUTOMATIC CHANGE SPEED GEAR SHIFT

Everett E. Hosea, Kaukauna, Wis., assignor, by mesne assignments, to Giddings & Lewis Machine Tool Company, Fond du Lac, Wis., a corporation of Wisconsin Application July 29, 1953, Serial No. 370,923

9 Claims. (Cl. 74—472)

The present invention relates generally to a shifting mechanism for change speed gearing, and more particularly to an improved control and operator for change speed gearing adapted to be shifted by rotation of a gear shift lever or shaft, such, for example, as the shiftable gearing disclosed in Keith F. Gallimore Patent No. 2,106,731, issued February 1, 1938 and Garner F. Schurger Patent No. 2,269,290, issued January 6, 1942.

It is a general object of the invention to provide for selecting a desired speed to be delivered by change speed gearing and for automatically shifting the gearing to obtain the preselected speed. Another object of the invention is to provide for the shifting of change speed gearing from conveniently located control positions, remote from the gear box if desired.

A more detailed object of the invention is to provide a shifter mechanism for change speed gearing which has a selector for preselecting a desired speed and a starter control for initiating automatic shifting of the gearing to obtain the preselected speed.

A further object is to provide for correcting misalinement of mating elements of the change speed gearing to permit shifting of the gearing without attention from an operator after the shifting operation is started. It is also an object of the invention to provide means for preventing damage to the shifter mechanism and change speed gearing as the result of overloading or jamming of the shifter mechanism or gearing. In more detail, it is an object of the invention to release loading on the change speed gearing during shifting and to interrupt the shifting momentarily until overloads on the shifting mechanism are removed.

Other objects and advantages of the invention will become apparent as the following description proceeds, taken in connection with the accompanying drawings, in which:

Figure 1 is a vertical elevation of a machine tool head stock with the speed change gearing shown in dotted outline to which is attached a gear shifting mechanism embodying the present invention.

Fig. 2 is a partial horizontal section of the head stock and gear shifting operator and control device taken along the line 2—2 of Fig. 1.

Fig. 3 is a detail view in vertical section of the pulsing mechanism taken along the line 3—3 of Fig. 2.

Fig. 4 is an enlarged detail view in section taken along the line 4—4 of Fig. 2.

Fig. 5 is a diagrammatic representation of an electrical circuit for use with the machine tool and gear shifting mechanism of the present invention.

While the invention is susceptible of various modifications, alternatives and variations, and the preferred embodiment of the invention is described herein in some detail, it is to be understood that the intention is not to limit the invention to the specific construction disclosed, but, on the contrary, the intention is to cover all modifications and alternative constructions falling within the scope and spirit of the appended claims.

Referring more particularly to the drawings, an automatic gear shifting mechanism 10 embodying the present invention is shown applied to change speed gearing 11, mounted in a machine tool head stock 12 for transmitting power from an electric drive motor 14 to a tool spindle 15. The gear shifting mechanism 10 is mounted in a generally rectangular housing 16 which is attached to the side of the head stock 12, the lower part of which forms a housing 13 for the change speed gearing. The spindle drive motor 14 is mounted on the upper portion of the head stock housing 12 and is drivingly connected to an input shaft 19 of the speed change gearing 11 by any desired gear or other drive arrangement (not shown). The tool spindle 15 is driven by an output shaft 20 of the gearing through an idler gear 21.

In the presently described application of the invention, the speed change gearing 11 to be operated by the shifter mechanism 10 is of the type described in the previously mentioned Patents Nos. 2,106,731 and 2,269,290. It will be appreciated, however, that the shifting mechanism to be described is applicable to other forms and types of speed change gearing adapted to be shifted by means of a rotatable shift lever or operator. In the present instance the shift lever or operator is a rotatable shaft 23 projecting laterally from the gear box housing 13 toward the housing 16 for the automatic shifting mechanism.

For present purposes, a brief description of the illustrative change speed gearing will be sufficient to an understanding of the present invention. Reference can be made to the above noted Patents Nos. 2,106,731 and 2,269,290 for a more detailed description of the gearing.

Shifting of the speed change gearing is accomplished through stepped rotation of the shifter shaft 23. A rotation through 120 degrees causes one gear shift, and rotation through three complete revolutions shifts the gearing through a complete cycle of nine sequential speed changes. The rotary movement of the shifter shaft 23 is utilized by means of a crank pin 24 at its inner end and a cooperating slot 25 formed in the adjacent end of a shifter shoe 26 to reciprocate the shoe back and forth on its supporting shifter bars 28. The remote end of the shoe 26 is bifurcated to engage opposite sides of an axially slidable gear 29 in continuous driven engagement on the input shaft by means of a spline connection 30.

When the slidable gear 29 is shifted to the midpoint of its reciprocating travel, it meshes with a mating center gear 32 fixed on an intermediate shaft 33 of the speed change gearing to provide one gear train from the input shaft 19 to the intermediate shaft 33. In the end positions of its travel, the slidable gear 29 is disengaged from the mating gear 32 and drivingly connects the input shaft 19 to either one or the other of two similar gears 34, spaced on opposite sides of the slidable gear and freely journaled of the input shaft. (Only one gear 34 is shown.) The sides of the slidable gear 29 and freely journaled gears 34 are provided with mating, axially extending clutch teeth 35 to provide a power connection from the input shaft 19 through the slidable gear 29 and its spline connection 30 to a selected one of the freely journaled gears 34 which continuously mesh with mating gears (not shown) fixed to the intermediate shaft 33. Thus, by rotating the shifter shaft 23 through one complete revolution, the slidable gear 29 is sequentially moved to its center position to provide one gear mesh with the intermediate shaft 33 and in its two end positions to provide second and third gear meshes. Varying the ratios of the respective meshing gears gives three speed changes between the input and intermediate shafts 19, 33.

Additional speed changes are provided by rotation of a second or auxiliary shifter shaft 37, having a crank pin 38 and slot 39 connection to a second shifter shoe 40 which reciprocates a slidable gear 42 having a spline connection 43 on the output shaft 20 in the same manner as the gearing and shifter previously described for the input shaft 19. The output shaft gearing is also similar to that of the input shaft 19 in having two freely journalled gears (not shown) which continuously mesh with mating gears on the intermediate shaft 33. By varying the ratios of the three pairs of meshing gears on the intermediate shaft 33 and the output shaft 20, the latter can be driven at three different speeds relative to the intermediate shaft 33 in the identical manner as for the input shaft 19.

By selecting different combinations of gear meshes from the input and output shafts, 19, 20 to the intermediate shaft 33, nine speed changes are provided. This is done by gearing the first or main shifter shaft 23 to the second or auxiliary shaft 37, preferably by means of a suitable intermittent or Geneva motion connection 45 of well known construction and which is described in detail in Schurger Patent No. 2,269,290. Briefly the intermittent motion connection 45 causes the main shifter shaft 23 upon one complete revolution to index the second or auxiliary shaft 37 through 120°. Thus for each of the three gear meshes between the intermediate and output shafts 33, 20 as determined by the position of the output shaft slidable gear 42, all three of the meshes between the input and intermediate shafts 19, 33, are engaged. As a result, nine speed changes are obtained in sequence upon three complete revolutions of the main shifter shaft, each change being made upon 120° rotation of the shaft. Since only rotary parts and a crank and slot arrangement perform the shifting action the order of selecting speeds may be reversed at any point, and the cycle of selecting the nine speeds may be repeated if desired.

In accordance with the present invention means are provided for automatically shifting the speed change gearing into any desired, preselected shift position. With reference to the construction shown in the drawings, when the operator of the machine tool wishes to change the spindle speed, he goes to a control panel 50 which may be located at any convenient position, rotates a selector switch knob 51 to the desired speed, as indicated by suitable markings 52 on the control panel, and presses a push button shift switch 53 on the panel which initiates the shifting operation and stops the spindle drive motor 14 during the shifting operation.

In the illustrated embodiment of the invention, power for performing the shifting operation is provided by a small reversible electric motor 55 mounted in the present instance on the front end wall 56 of the shifting mechanism housing 16 in a crosswise position. Interconnecting the shifter motor 55 with the main shifter shaft 23 is a power transmitting shaft 57 connected at its rear end to the shifter shaft through a pair of bevel gears 58 having a ratio of one to one. The forward end of the power shaft 57 is drivingly connected to the motor shaft through a stub shaft 60, journalled in the front wall 56 of the shifter housing, and suitable bevel gearing (not shown) between the stub shaft 60 and shifter motor 55. When the motor 55 is energized, the interconnecting power shaft 57 is rotated and in turn rotates the shifter shafts 23, 37 through the number of revolutions or part of a revolution necessary to provide the desired speed change.

The main and auxiliary shifter shafts 23, 37 in the illustrated construction are journalled in the inner side wall 61 of the shifter housing, and form a part of the shifter unit. The shafts 23, 37 are readily engageable and disengageable from the speed change gearing merely by inserting or withdrawing the eccentric pins 24, 38 from their respective receiving slots 25, 39 in the shifter shoes 26, 40. The shifter mechanism can thus be readily mounted and dismounted from the speed change gear box 13.

Provision is made for controlling the movement of the shifter motor 55 and interconnecting shaft 57 for rotating the main shifter shaft 23 to any selected one of the nine speed change shift positions. For this purpose, a set of individual stop or limit switches 62 and a manually operated selector switch 64 are arranged in the electrical input circuit of the shifter motor 55 such that the selector switch 64 may be set for a particular gear shift position and the shifter motor 55 will rotate the shifter shaft 23 until the selected shift position is reached when the motor 55 is stopped by the opening of one of the stop switches 62.

Actuating of the stop switches 62 which correspond to individual ones of the shift positions is accomplished by means of a cam arrangement controlled by a timer or control shaft 65. The control shaft 65 is journalled adjacent its forward end in an intermediate wall 66 of the shifter housing, and extends rearwardly to the rear portion of the housing, having its rear end journalled in the rear wall 67 of the housing. Means are provided in the form of a pair of mating spur gears 69, 70 fixedly mounted on the power shaft 57 and control shaft 65 respectively for actuating the cam and stop switch mechanism. In the present instance, the spur gears 69, 70 have a ratio of one to three so that the control shaft rotates through one revolution for each three revolutions of the power and shifter shafts 57, 23. Thus, in relation to the speed change shift positions, the control shaft 65 makes one revolution for each complete cycle of nine gear changes.

The stop switch actuating cams comprise a series of nine cams 71, one for controlling each shift position. The cams 71 are substantially circular in outline and fixedly mounted on the control shaft 65. Associated with each cam 71 is one of the stop switches 62 which are of conventional design of the type having a normally closed pole. Each switch 62 has a generally rectangular casing 73 from one side of which projects an axially movable operator rod 74 having a roller follower 75 on its outer end for riding over the peripheral surface of the cams 71. The operator rod 74 is resiliently biased toward its outer position to close the switch and movable inwardly against the resilient force to open the switch. Each switch 62 is supported by means of an angle bracket 77 fastened to the inner side wall 61 of the shifter housing and is positioned closely adjacent its associated cam 71 to press the follower roller 75 against the cam surface and hold the operator rod 74 in its inner closed switch position.

Each cam 71 has a single cam notch 78 at one point on its periphery shaped to permit the roller follower 75 to move outwardly from the switch casing 73 into the notch to open the switch at one angularly rotated position of the cam 71. Thus means is provided to hold each cam actuated stop switch 62 in closed position during the complete revolution of the control shaft 65, that is the complete shifting cycle, except for one angular position of control shaft rotation. By staggering the relative positions of the notches 78 on the respective cams, the stop switches 62 can be opened sequentially as each switch follower 75 is engaged by a notched portion of the cams 71 for stopping the shifting mechanism at selected shift positions.

In the illustrative device, the cams 71 and notches 78 are staggered relative to each other to actuate the respective stop switches in sequential order at intervals of forty degrees of control shaft rotation, being the equivalent of one-ninth of one complete revolution of the control shaft. In the present instance, for the purpose of providing a compact unit, the stop switches 62 are alternately positioned above and below the control shaft 65 to reduce the needed length of control shaft. The stop switches 62 for sequential shift positions 1, 3, 5, 7 and 9 are above the control shaft 65, while the switches 62 for positions 2, 4, 6, and 8 are below. With this switch arrangement, the notch positions for the upper and lower switches, as shown in Fig. 4 of the drawings, are one hundred eighty degrees out of relationship or phase with each other. The notches 78 for the succeeding upper and lower stop switches 62 are therefore spaced one hundred eighty degrees plus forty degrees from each other.

The operation of the shifting mechanism as thus far described will be more fully understood with reference to the wiring diagram of Fig. 5 which illustrates the shifting mechanism used in conjunction with a reversible drive motor 14 for a machine tool. The drive motor 14 is a conventional three phase type supplied from a three wire power line 80, 81, 82 with the usual reversing input circuits for right and left hand rotation of the motor. The input circuits comprise two sets of reversing switches 83, 84 interposed between the power supply wires and the drive motor terminals, one set 83 completing a circuit from each supply wire to the motor for rotation in a right hand direction and the second set 84 for completing a circuit from each supply wire in which the connections to the two outside supply wires 80, 82 are reversed for left hand rotation.

The reversing switches 83, 84 are closed alternately by energizing respective right and left relay coils 86, 87 which are controlled by right and left push button switches 88, 89. The latter each have a normally open initiating switch section 90, 91 for energizing the corresponding relay coil and a normally closed deenergizing switch section 92, 93 for deenergizing the opposed relay coil. Actuation of the right push button switch 88 completes an energizing circuit for the right relay coil 86 from the center power supply wire 81 through a normally closed push button stop switch 94, an interlock switch 95, the now closed initiating switch section 90 of the right push button, the normally closed deenergizing switch section 93 of the left push button, and the right relay coil 86 to the left power supply wire 80. In addition to closing the motor input switches 83 for right hand rotation, energizing the right relay coil 86 closes a relay controlled holding switch 96 which completes a by-pass circuit around the initiating section 90 of the right push button to maintain the right relay coil energizing circuit after the operator releases the right push button switch 88 and the initiating switch section 90 returns to its normally open position.

To reverse the motor rotation, the left push button switch 89 is pressed which opens the normally closed deenergizing switch section 93 and breaks the holding circuit to the right relay coil 86, allowing the motor input switches 83 for right hand rotation to open. The normally open initiating switch section 91 of the left push button switch is closed at the same time which energizes the left relay coil 87 by completing a circuit through the stop switch 94, interlock relay switch 95, normally closed deenergizing switch section 92 of the right push button switch, the now closed initiating section 91 of the left push button switch, the left relay coil 87 to the left power supply wire 80. The motor input switches 84 for left rotation and a left holding switch 97 controlled by the left relay coil 87 are thus closed to maintain the circuit connections for left hand rotation.

The drive motor 14 may be stopped at any time by pressing the normally closed stop switch 94 which is in a circuit common to both right and left relay coils 86, 87. When the stop switch 94 is opened, the energized one of the right or left relays is deenergized to cause the corresponding closed set of motor input switches 83, 84 and the closed relay holding switch 96, 97 to open. The motor is thus stopped, until one or the other of the right or left push button switches is manually operated to restart the motor.

For actuating the gear shifting and controlling the gear shifting mechanism, an energizing circuit is also provided for the shifter motor 55. Selective rotation of the shifter motor 55 to the desired shift positions is accomplished by arranging in series with the shifter motor a switching network which includes a series of parallel branches, nine branches being used in the present instance, one for each available shift position. In each branch is one of the cam actuated switches 62, which is connected at one terminal to a common junction 99 of all branches and at the other to a corresponding one of a series of stationary contacts 100 in the selector control switch 64. The selector switch 64 is mounted on the control panel 50 and has a movable contact 101 which is swung into engagement with individual ones of the stationary contacts 100 by the hand control knob 51 for selecting the speed change desired. The movable contact 101 is electrically connected to one terminal of the shifter motor 55. A push button type initiating shift switch 53 is also provided and when in closed position completes the shift motor energizing circuit from the center power supply wire 81 through the shift switch 53, a selected one of the cam switches 62, the selector switch 64 and the shifter motor 55 to the left supply wire 80.

In the wiring diagram as shown in Fig. 5, the shifting mechanism has completed a shifting operation, and the speed change gearing is in sequential shift position number 8. The selector switch 64 is shown engaging the stationary contact 100 connected to the cam stop switch 62 corresponding to this shift position, indicating that the control shaft 65 and cam 71 have been rotated until the cam follower 75 of this switch 62 has entered the cam notch 78. In this circuit condition, pressing the shift switch 53 does not start the shift motor 55 since the circuit is broken by the open cam switch 62. If the machine operator wishes to change speeds, he moves the selector switch knob 51 to make contact with any of the other cam switches 62, for example, the cam switch corresponding to shift position 6. This cam switch 62 is closed because the staggered cam arrangement previously described opens only one cam switch at a time. If the operator now pushes the shift switch 53, the shifter motor circuit is completed, and the motor 55 will be energized until shift position number 6 is reached at which time the notch 78 in the cam actuating the selected cam switch will have been rotated into line with the switch follower 75 allowing the switch to open and stopping the shifter motor.

To insure safe shifting of the speed change gearing without damaging the gearing, means are provided for removing any load transmitted by the gearing during the shifting operation. For this purpose, an interlocking circuit arrangement is provided to deenergize and stop the drive motor 14 when the shift motor 55 is started. This circuit comprises the normally closed interlock switch 95 which is controlled by an interlock relay coil 103 connected in parallel with the terminals of the shifter motor 55 and consequently is energized to open the interlock switch 95 whenever the shifter motor is started. The interlock switch 95 is in series with the drive motor stop switch 94 and when opened deenergizes the drive motor control relay coils 86, 87 to stop the drive motor in the same manner as previously described in connection with the stop switch 94.

Also controlled by the interlock relay 103 is a shifter holding switch 104 which is normally open, but upon energization of the interlock relay coil 103 closes a circuit by-passing the push button shift switch 53 to maintain the completed circuit after the shift switch is released. Opening of the selected cam switch 62 deenergizes the interlock relay coil 103 which releases the holding switch 104 to open position.

The shifting mechanism is operable in repetitive cycles, as previously described, and therefore a simple non-reversing electric shifter motor 55 may be used. However, it is highly advantageous to provide a reversible shifter motor 55 and a reversing circuit so that the least number of intermediate shift changes are made before the desired shift position is reached. In the illustrative embodiment, the shifter motor 55 is a single phase, split field reversing motor of well known type. Suffice it to say that the motor has two field windings 105, 106 for rotating the motor shaft in forward and reverse directions by connecting one or the other of the windings to the power source. For this purpose, a simple, single pole, double throw reversing switch 108 is interposed in the shifter motor circuit between the selector switch and the respective motor field windings 105, 106. The shifter motor reversing switch 108 may be a separate switch unit independently operated or may be an auxiliary section on the selector switch 64 automatically thrown from one position to the other upon reversing the order in which the cam switch circuits are selected. A switch mechanism of the latter form, particularly suited for this purpose is disclosed in copending application Serial No. 370,914, filed July 29, 1953, now Patent No. 2,750,459, dated June 12, 1956, by Adrian T. Godschalx and Everett E. Hosea and assigned to a common assignee. By way of example, to shift from speed change position number 7 to position number 8, the reversing switch 108 is thrown to energize the shifter motor field winding 105 for forward rotation, and to go from position number 8 to position number 7, the switch 108 is thrown in the reverse direction so that the shifting need not proceed through the forward sequence of speed change shift positions numbers 9, 1, 2, 3 and so on to number 7.

The illustrated rotary selector switch may, if desired, be replaced by a set of push button switches mechanically interconnected to lock an actuated switch in closed position and release any previously closed switch so that only one switch is closed at one time. Such switch sets are well known in the art and need not be described in detail. Each switch of the set would be a single pole, single throw switch having one terminal connected to a corresponding cam actuated switch 62 and the other terminal to the shifter motor reversing switch 108. Preferably, in parallel connection with the shifter motor 55 for coincident energization, are a pilot lamp 98 for indicating operation of the motor and a brake coil 102 of a conventional electrical brake for stopping the motor shaft upon deenergization of the drive motor 55.

With the shifting mechanism as thus far described, automatic shifting of the speed change gearing is possible only if mating elements of the gearing are angularly alined to permit meshing of the mating gear and clutch teeth. Since such alinement is merely a matter of coincidence, the operator would have to rotate or otherwise jog the gearing into alinement.

Further in accordance with the present invention, means are provided for automatically alining the mating gear and clutch teeth to permit meshing engagement and prevent jamming of the mechanism during the shifting operation. For this purpose, there are both an overload release mechanism to break the driving connection between the shifter motor 55 and power shaft 57, and an automatic jogging mechanism for alining the speed change gearing.

Referring to Fig. 2 of the drawings, the overload release mechanism comprises a two-piece toothed clutch having one clutch member 110 rigidly secured to the shifter power shaft 57 and a movable clutch element 111 mounted for axial sliding on the stub shaft 60. The stub shaft 60 is journalled in the front wall 56 of the shifter housing by a set of ball bearings 112, and is held against axial movement by an integral collar 114 and a snap ring 115 or other suitable fastener which bear against the rear and forward sides, respectively, of the ball bearings 112.

The movable clutch member 111 is of cylindrical outline and has a central bore 116 into which the rear end portion of the stub shaft 60 projects. A series of axially extending keys 118, received in axially extending slots in the bore 116 of the clutch member and in key seats in the stub shaft 60, rotate the clutch member 111 and stub shaft 60 in unison but permit relative axial sliding.

The movable clutch member 111 is resiliently pressed towards its rearmost position and into engagement with the power shaft clutch member 110 by means of a coil spring 121 surrounding the stub shaft 60 between the stub shaft collar 114 and the forward end face of the movable clutch member 111. On the rear end face of the movable clutch member 111 and forward end face of the power shaft member 110 are axially projecting clutch teeth 122 of saw-tooth shape having sloping side faces as shown in Fig. 5 of the drawings. With this tooth configuration, excessive torque on the power shaft 57, as when mating speed change elements are misalined, will cause the respective clutch teeth 122 to ride up on each other, camming the movable clutch member 111 forwardly against the resilient force of the coil spring 121 and allowing the clutch members 110, 111 to slip before damage occurs to the shifting mechanism or speed change gearing.

For alining the speed change gearing, the axial and rotary movement of the movable clutch member 111 is used to jog the speed change gears into alinement by means of a linkage which actuates a drive motor start and stop switch. Momentary rotation of the gearing quickly and automatically alines mating parts of the gearing. For this purpose, a drive motor pulsing switch 123 is mounted on the front end wall 56 of the shifter housing, and means is provided for interconnecting the movable clutch member 111 and pulsing switch 123 to actuate the latter upon forward axial releasing movement of the clutch member 111. The pulsing switch 123 is of the normally open type and has a push rod actuator 124 which extends rearwardly for movement in a direction parallel to that of the movable clutch member 111. The interconnecting means comprises an external flange 126 on the clutch member and a rigid link 127 adapted for contact engagement with the flange 126 and with the pulsing switch push rod 124 at its rear and forward ends, respectively. In the present instance, the rigid link 127 is of generally T shape, having a cross bar 128 extending generally radially across the front face of the clutch flange 126. A roller 129 is pivotally mounted on one end of the cross bar 128 for engaging the flange when the clutch is cammed forwardly. The other end of the cross bar 128 has a generally horizontal slot 130 for receiving the guide pin 132 rigidly mounted on the outer side wall 133 of the shifter housing to limit the rigid link 127 to forward and rearward motion. Fixed to the cross bar intermediate its ends is a rod 134 which extends forwardly through a hole 135 in the front wall 56 of the housing into abutting engagement with the switch push rod operator 124. The forward end portion of the hole is counterbored at 136 to receive a coil spring 137 which is positioned between a collar 138 fixed to the link rod 134 and a cover plate 139 over the counterbore 136 for urging the link rearwardly. Rearward movement of the link is limited by abutting engagement between the collar and a shoulder 140 formed at the bottom of the counterbore 136.

To provide momentary pulsing of the drive motor 14 and speed change gearing, the forward face of the clutch flange 126 is provided with a circular series of abutments which in the present instance are forwardly projecting ends of screws 142 received in threaded holes in the flange. As the movable clutch member 111 is cammed forwardly by an overload, rotation of the flange 126 continues and the abutments or screws 142 will momentarily push the rigid link 127 forwardly as they are rotated into and out of engagement with the link roller 129. In the normal drive position of the clutch, the abutments 142 do not contact the link roller 129 since they have been moved rearwardly out of engaging position. Preferably, the abutments 142 are set at irregular intervals about the flange 126 for irregular and highly effective pulsing of the drive motor.

For operating the drive motor 14 only for the short instant that the pulsing switch 123 is closed by the movable clutch member 111, an electrical circuit by-passing the reversing push button switches 88, 89 is provided during operation of the shifting mechanism. For this purpose, a normally open interlock pulse control switch 143, actuated by the interlock relay coil 103, and the pulsing switch 123 itself are connected in series between the stop switch 94 which is normally closed and one terminal of the right relay coil 86, or left relay coil 87, if desired. Upon initiating the shifter motor 55 by pressing the shift switch 53, the interlock relay 103 opens the interlock stop switch 95 to deenergize the drive motor reversing relays 86, 87, and closes the interlock pulse control switch 143. The pulsing switch 123 is open so that no power is supplied to operate the drive motor relays 86, 87. When misalinement of the speed change gearing is encountered, the overload clutch members 110, 111 release the load on the shifter power shaft 57 and by means of the interconnecting linkage, indicated by a dot-dash line in Fig. 5, alternately close and open the pulsing switch 123. Closing of the pulsing switch 123 completes a circuit from the center power supply wire 81 through the stop switch 94, the pulsing switch 123, interlock pulse control switch 143 and the right relay coil 86 to the left power supply wire 80. The right relay coil 86 is thus energized and closes the corresponding power switches 83 to operate the drive motor 14. Since there is no holding circuit for the pulsing switch 123, as soon as the latter is opened by disengagement of an abutment 142 on the clutch flange 126 with a link roller 129, the drive motor stops. This action continues until the mating gear or clutch teeth of the speed change gearing are alined for meshing engagement.

It will be appreciated that such automatic jogging or pulsing will occure for any misalinement of mating gear and clutch teeth both for the final, preselected gear shift position and for any intermediate shift positions through which the gear moves before reaching the desired preselected position. Thus once the desired shift position has been selected and the shift switch is pushed, no further attention is required on the part of the operator since the shifting mechanism operates automatically until the desired speed change is made, at which time the shifter motor is automatically stopped.

I claim as my invention:

1. An automatic preselective shift mechanism for use with shiftable gearing, and a power source for driving said gearing, the latter having a shifter for effecting individual ones of a plurality of gear shift positions, comprising, in combination, electric motor means for actuating said shifter into individual ones of the gear shift positions, an input circuit for said electric motor means having a manually operated selector switch for preselecting individual ones of the shift positions, and stop switch means for stopping said shifter motor upon movement of said shifter into a preselected one of the shift positions, means for interrupting actuation of said shifter when misalinement of said gearing prevents movement of said shifter into a shift position, and means for intermittently starting and stopping said power source upon interruption of said shifter actuation to rotate said shiftable gearing into alinement to permit movement of said shifter into a shift position.

2. For use with speed change gearing having a shifter for effecting individual ones of a plurality of shift positions and connected to an electric drive motor, a shifting mechanism, comprising, in combination, an electric shifter motor having a motor shaft, means for drivingly connecting said motor shaft and said shifter for moving the latter into the said shift positions, means for controlling said shifter motor to move said shifter into a selected shift position, means for releasing the connecting means upon overloading of said shifting mechanism due to misalinement of mating gears preventing movement into a shift position, means for intermittently starting and stopping said drive motor when said connecting means is released for alining the mating gears to allow shifting movement to proceed, and means for stopping said drive motor and for connecting said intermittent starting and stopping means to said drive motor upon energization of said shifter motor.

3. For use with speed change gearing connected to an electric drive motor and having a shifter for effecting individual ones of a plurality of shift positions, a shifting mechanism comprising, in combination, an electric shifter motor having a motor shaft, means for interconnecting said motor shaft and said shifter for moving the latter into the said shift positions, means for controlling said shifter motor to move said shifter into a selected shift position, means for alining mating gears in said speed change gearing to permit shifting of the latter into shift positions including an overload clutch interposed in said interconnecting means for releasing the driving connection between said shifter and said shifter motor so long as misalinement of mating gears prevents movement of said shifter into a shift position, switch means for controlling said drive motor, and means for actuating said switch means upon breaking of the driving connection to start and stop said drive motor for rotating misalined mating gears into meshing relationship so that shifting of said speed change gearing may be effected.

4. An automatic preselective gear shifting mechanism for use with change speed gearing having a shifter adapted to be rotated for shifting said gearing into individual ones of a plurality of speed change shift positions and an electric drive motor connected to said speed change gearing, comprising, in combination, a shifter motor having a motor shaft, means for interconnecting said motor shaft and said shifter, an input circuit for said shifter motor including a selector switch for preselecting a desired shift position, a plurality of cam operated stop switches in parallel with each other and in series with said selector switch for stopping said shifter motor upon movement of said shifter into the preselected shift position, and control switch means for initiating operation of said shifter motor and for stopping said drive motor during operation of said shifter motor, means interposed in said interconnecting means for releasing the drive connection between said shifter and said motor shaft when misalinement of said speed change gearing prevents movement of said shifter into a shift position, switch means arranged to by-pass said control switch means and actuated by said releasing means for alternatively starting and stopping said drive motor until said speed change gearing is alined to permit movement of said shifter into a shift position.

5. For use with speed change gearing having a shifter for effecting individual ones of a plurality of shift positions and connected to an electric drive motor, a shifting mechanism comprising, in combination, an electric shifter motor having a motor shaft, means including a rotatable shaft for interconnecting said motor shaft and said shifter for moving the latter into the said shift positions, means including a series of cams driven by said shifter motor shaft and a series of associated cam operated switches for controlling said shifter motor to move said shifter into a selected shift position, means for alining mating gears in said speed change gearing to permit shifting of the latter into shift positions including an overload clutch interposed in said interconnecting shaft, said clutch including a driven element and a driving element, one of said clutch elements being axially movable relative to the other and being resiliently biased into engagement with said other element, each of said elements having mating clutch teeth shaped to move said movable element in an axial direction for releasing said clutch so long as misalinement of mating gears prevents movement of said shifter into a shift position, a first switch means for stopping said drive motor upon initiation of operation of said shifter motor, a second switch means in a parallel circuit connection with said first switch means for starting and stopping said drive motor, and means including a linkage engageable by said movable clutch member upon axial movement thereof for actuating said second switch means upon breaking of the driving connection to start and stop said drive motor for rotating misalined mating gears into meshing relationship so that shifting of said speed change gearing may be effected.

6. An automatic preselective shift mechanism for use with speed change gearing and an electric drive motor connected to said gearing and having an input power circuit, said gearing having a rotatable shaft for effecting speed changes upon rotation of said shaft into individual ones of a plurality of shift positions, comprising, in combination, a shifter motor having a motor shaft, a rotatable shaft for interconnecting said shifter motor shaft to said gear shift shaft to rotate the latter into the shift positions, a clutch interposed between said motor shaft and said interconnecting shaft, said clutch including a driven element and a resiliently biased axially movable driving element, said elements having sloping clutch teeth for camming said movable element axially against the resilient bias upon misalinement of mating gears of said gearing overloading said shifting mechanism, an input circuit for said shifter motor having a plurality of stop switches arranged in parallel and corresponding in number to the number of shift positions, a manually operated selector switch in said input circuit for preselecting individual ones of said stop switches, and shift control switch means in said input circuit for initiating operation of said motor to shift said gearing to the speed selected by said selector switch, cam means for actuating said stop switches in response to movement of said interconnecting means into a preselected shift position, a switch for starting and stopping said drive motor, means for actuating said drive motor switch including a flange on said movable clutch member, a series of abutments on said flange, and a linkage engageable by said abutments when said movable clutch member is moved axially against the said resilient bias for closing and opening said switch to start and stop said drive motor intermittently, and interlocking switch means actuated upon starting of said shifter motor for opening said drive motor input circuit and placing said drive motor switch in said drive motor input circuit.

7. For use with speed change gearing having a shifter for effecting individual ones of a plurality of shift positions and connected to an electric drive motor, a shifting mechanism comprising, in combination, an electric shifter motor having a motor shaft, means including a power shaft for interconnecting said motor shaft and said shifter, means for controlling said shifter motor to move said shifter into a selected shift position, means for alining mating gears in said speed change gearing to permit shifting of the latter into shift positions including an overload clutch interposed between said power shaft and said motor shaft, said clutch having a clutch element rigidly fixed on said power shaft and a movable element drivingly connected to said motor shaft and mounted for axial movement relative to said fixed element, each of said elements having mating clutch teeth, means for resiliently urging said movable element in a direction for mating engagement with said fixed element, said clutch teeth having sloping sides for camming said movable element against the force of said resilient means to disengage said clutch upon overloading of said shift mechanism, and switch means for controlling said drive motor, said switch means being normally in stop position, and means including a linkage axially spaced from the movable clutch for engagement by the latter upon overloading of said shift mechanism for closing said drive motor switch means to start said drive motor and rotate the speed change gearing into alined position.

8. An automatic preselective gear shifting mechanism for use with change speed gearing having a shifter adapted to be rotated for shifting said gearing into individual ones of a plurality of speed change shift positions and an electric drive motor having an input circuit for driving said speed change gearing, comprising in combination, a shifter motor having a motor shaft, means for interconnecting said motor shaft and said shifter, an input circuit for said shifter motor including a series of stop switches in parallel with each other and corresponding to respective shift positions, a selector switch having a series of stationary contacts connected to respective ones of said stop switches and a movable contact for preselecting one of said stop switches, control switch means for initiating operation of said shifter motor, and a relay coil energized upon initiation of operation of said shifter motor, a first relay switch actuated by said relay coil for stopping said drive motor during operation of said shifter motor, means for opening said stop switches sequentially in response to rotation of said shifter for stopping said shifter motor upon movement of said shifter into a preselected shift position, means interposed in said interconnecting means for releasing the drive connection between said shifter and said motor shaft when misalinement of said speed change gearing prevents movement of said shifter into a shift position, a normally open switch means actuated by said releasing means for alternatively closing and opening said switch means, a second relay switch operated by said relay coil for connecting said normally open switch means in by-passing relation to said first relay switch for starting said drive motor upon closing of said normally open switch means to jog said change speed gearing into meshing alinement.

9. An automatic preselective gear shifting mechanism for use with change speed gearing having a shifter adapted to be rotated for shifting said gearing into individual ones of a cycle of speed change shift positions and an electric drive motor connected to said speed change gearing, comprising in combination, a shifter motor having a motor shaft in driving connection with said shifter, an input circuit for said shifter motor including a selector switch having a series of stationary contacts and a movable contact for preselecting a desired one of the shift positions, a plurality of cam operated stop switches in parallel with each other and connected to respective ones of said stationary contacts for stopping said shifter motor upon movement of said shifter into the preselected shift position, and control switch means for initiating operation of said shifter motor and for stopping said drive motor during operation of said shifter motor, means for temporarily releasing the drive conection between said shifter and said motor shaft when misalinement of said speed change gearing prevents movement of said shifter into a shift position, and switch means arranged to by-pass said control switch means and actuated upon releasing of the said driving connection for alternatively starting and stopping said drive motor until said speed change gearing is alined to permit movement of said shifter into a shift position.

References Cited in the file of this patent
UNITED STATES PATENTS

| | | |
|---|---|---|
| 2,266,696 | Wettig | Dec. 16, 1941 |
| 2,489,725 | Rutemiller | Nov. 29, 1949 |
| 2,529,067 | Bennett | Nov. 7, 1950 |
| 2,540,573 | Evans | Feb. 6, 1951 |